United States Patent [19]

Petrow et al.

[11] 4,082,699

[45] Apr. 4, 1978

[54] METHOD OF PREPARING CATALYTIC STRUCTURES FROM COLLOIDAL PLATINUM COMPOUNDS AND SUCH CATALYTIC STRUCTURES

[75] Inventors: Henry G. Petrow, Watertown; Robert J. Allen, Saugus, both of Mass.

[73] Assignee: Prototech Company, Newton, Mass.

[21] Appl. No.: 725,428

[22] Filed: Sep. 22, 1976

Related U.S. Application Data

[63] Continuation-in-part of Ser. No. 535,031, Dec. 20, 1974, Pat. No. 3,992,331, and a continuation-in-part of Ser. No. 534,731, Dec. 20, 1974, Pat. No. 4,044,193.

[51] Int. Cl.$^2$ .............................................. B01J 23/42
[52] U.S. Cl. ................................................. 252/472
[58] Field of Search ................. 252/447, 460, 466 PT, 252/472

[56] References Cited

U.S. PATENT DOCUMENTS

| 3,531,329 | 9/1970 | Selwitz | 264/61 X |
| 3,684,742 | 8/1972 | Pollitzer | 252/460 |

FOREIGN PATENT DOCUMENTS 827,079  2/1960  United Kingdom .......... 252/466 PT

*Primary Examiner*—W. J. Shine
*Attorney, Agent, or Firm*—Rines and Rines, Shapiro and Shapiro

[57] ABSTRACT

This disclosure deals with novel supported platinum catalysts and methods of producing the same by the uniform deposition of colloidal meta-stable, and thus transient, platinum metal particles on the surface of substrates of widely-varying specific surface areas, such particles resulting preferably from the complex sulfite and the like oxidized by a solution of hydrogen peroxide or like oxidant.

7 Claims, No Drawings

METHOD OF PREPARING CATALYTIC STRUCTURES FROM COLLOIDAL PLATINUM COMPOUNDS AND SUCH CATALYTIC STRUCTURES

This application is a continuation-in-part of application Ser. No. 535,031, now U.S. Pat. No. 3,992,331, and Ser. No. 534,731, filed Dec. 20, 1974, now U.S. Pat. No. 4,044,193 and incorporated herein by reference, which applications were continued from parent application Ser. No. 153,824, filed June 16, 1971, now abandoned, and continued as application Ser. No. 430,190, filed Dec. 28, 1973, now abandoned, having been filed in response to a Patent Office requirement for restriction or division in connection with supported platinum catalysts and methods of preparation thereof.

The present invention relates to supported platinum catalysts comprising new platinum compounds, sols and particulated platinum deposits derived therefrom, and to methods of preparing such supported catalysts; being preferably, though not exclusively, concerned with catalytic oxidations and the like.

The art is, of course, replete with numerous compounds and processes employed to provide platinum deposits for use as catalysts in a myriad of applications including oxidation, hydrogenation, dehydrogenation, reforming, cracking, chemical reaction-aiding, contaminant burning, electrochemical cell electrode operation and the like, all hereinafter generically connoted by reference to "catalytic" usage. Particulated platinum has been employed to provide increased effective surface areas, as by adherence to rough substrata, such as carbon, alumina and other substrates, such deposits being obtained from compounds such as platinum tetrachloride, cholrplatinic acid and the like.

An object of the invention is to provide a novel method of preparing catalytic structures from transient colloidal sols derived from a complex platinum compound, of general application to conductive and refractory substrates of widely varying specific surface areas, and novel catalytic structures prepared thereby and having finely deposited platinum metal particles uniformly nucleated, adsorbed and adhered to the substrate.

Other and further objects will be explained hereinafter and are more particularly delineated in the appended claims.

A first discovery underlying a part of the invention resides in the rather unexpected fact that a novel complex platinum sulphite acid void of chlorine may be prepared from chloroplatinic acid and particularly adapted for the formation of a colloidal sol from which extremely finely particulated platinum may be deposited. While prior experience had led those skilled in the art to consider either that adding $SO_2$ to chloroplatinic acid would invariably result in reducing the platinum to the "2" state, without replacing chloride in the complex with $SO_3^-$, yielding chloroplatinous acid (see, for example, H. Remy, *Treatise on Inorganic Chemistry*, Vol. 2, p. 348), or that the reaction of $SO_2$ with a platinum compound resulted in its reduction to the metallic or zero valence state ("Applied Colloidal Chemistry", W. N. Bankcroft, McGraw Hill, 1926, p. 54), it has been discovered that through appropriate pH and other controls, a complex platinum acid containing sulphite (and to the complete exclusion of chloride) is decidedly achievable. And from such complex acid, unusual colloidal sols depositing particulate platinum in the 15–25 Angstrom range can readily be obtained, and thus vastly superior catalytic performance attained.

Specifically, one of the preferred methods for the preparation of this novel complex platinum acid (represented substantially by a formula containing two moles of $SO_3^=$ per mole of platinum) involves the neutralizing of chloroplatinic acid with sodium carbonate, forming orange-red $Na_2 Pt (Cl)_6$. Sodium bisulfite is then added, dropping the pH to about 4, and with the solution changing to pale yellow and then to a substantially colorless shade. Adding more sodium carbonate brings the pH back to neutral (7), and a white precipitate forms in which the platinum has been found to be contained in excess of 99% of the platinum contained in the chloroplatinic acid starting sample. It was believed (now confirmed) that this precipitate contains six atoms of sodium and four moles of $SO_3^=$ per atom of platinum. It is slurried with water, and then enough strong acid resin is added (such as sulfonated styrene divinyl benzene in the hydrogen form — DOWEX-50, for example), to replace three of the Na atoms. The solution is filtered to remove resin and then passed through an ion-exchange column with sufficient of the said acid resin to replace the other three Na atoms. Inherently, during this two-step cation exchange, copious quantities of $SO_2$ are liberated, amounting to a loss of substantially two moles of $SO_2$/mole Pt. Boiling to concentrate the solution, results in the novel complex sulfite platinum acid compound above discussed containing groups of (OH) and $H_3Pt(SO_3)_2$, free of excess unbound $SO_2$.

In compliance with a requirement in the earlier applications from which the present application is continued, for evidence of the reasons for the conclusion as to the above formulations, a summary of such evidence is herein presented, though it is not in any way part of the essential disclosure of this application and is not required for the practice of the invention as originally disclosed, since precisely following the steps of the disclosure of said applications will produce the precise products and results of the invention as originally described.

Proof of the above-stated complex character of this novel platinum acid has been obtained by reacting 0.0740 g-mole of chloroplatinic acid in the form of the commercial material containing 40% by weight of Pt to form the "white precipitate" precisely in accordance with the method described above and in the said prior applications. The "white precipitate" weighed 48.33 g, after filtering, washing and drying at 150° C (to constant weight). The filtrate contained 40 ppm platinum, as determined by atomic adsorption, showing that more than 99% of the original platinum contained in the sample of chloroplatinic acid was present in the precipitate. Thus, the precipitate has an empirical formula weight of about 653 based on one atom of Pt[48.33/0.0740]≅653. Chemical analysis showed that the salt contained 21.1% Na (by atomic adsorption), 29.9% Pt (by atomic adsorption) and 48.7% $SO_3$ (by oxidative fusion and $BaSO_4$ precipitation and by $KMnO_4$ titration), thereby confirming the presence of substantially 6 Na and 4 $SO_3$ per Pt atom.

The precipitate was then converted to the complex acid solution in accordance with the precise procedure described above and in said prior applications. It was boiled to a concentration approximately 2 molar in Pt (2 g atoms Pt/liter of solution).

When the acid was concentrated to this strength, $SO_2$ was no longer evolved.

1. A sample of substantially water-free complex platinum acid, prepared by distillation under high vacuum, was found to contain 52% Pt by weight determined by thermogravimetric analysis.

2. A sample of complex platinum acid (in solution) was found to have a sulfur content of 42.6% by weight, as $SO_3$, determined by oxidative fusion and $BaSO_4$ precipitation and by oxidometric titration with $KMnO_4$, i.e. 2 moles of sulfite/mole Pt.

3. Titration of a sample of the complex platinum acid with standard base showed a characteristic titration curve with three titratable hydrogen ions per atom of Pt, amounting to 0.8% by weight, two of which were strongly acid (i.e. completely dissociated) and the third quite weakly acid ($K_a \sim 10^{-8}$ for the third $H^+$ ion).

4. A sample of complex platinum acid was found to contain one OH group per atom Pt, or 4.54% by weight OH, determined by neutralizing the three acid hydrogens with NaOH to pH 9.5, then reacting with excess sodium sulphite solution of natural pH = 9.5, thereby gradually reforming white precipitate having the above described composition, and raising the pH of the reaction mixture above 12, and back-titrating with $H_2SO_4$ to pH 9.5.

5. A sample decomposed at about 400° C in nitrogen yielded only oxides of sulfur ($SO_2$ and $SO_3$) and water in the gas phase, and Pt metal residue.

6. Addition of silver nitrate to the acid yielded a yellow product insoluble in dilute sulfuric acid.

From these experiments, the following is concluded:

1. The acid contains only H, O, Pt and S. (The replacement of $Na^+$ by $H^+$ in the ion exchange step cannot introduce any other element); Cl is absent.

2. The acid contains Pt and S in the ratio of 1:2.

3. The sulfur is present as sulfite as shown by the analysis and by the high temperature decomposition of the acid in nitrogen.

4. The sulfite has to be complexed because (a) the complex acid (no $SO_2$ odor) is completely dissociated whereas the ionization constants of $H_2SO_3$ (which is odorous) are $1.54 \times 10^{-2}$ and $1.02 \times 10^{-7}$, respectively; (b) the complex acid is more soluble in water than $H_2SO_3$ at the boiling point (max. solubility of $SO_2$ is 5.8g/l or 0.07 molar in $H_2SO_3$ at 100° C vs. the 2 molar acid produced by the method of this invention); and (c) silver sulfite is soluble in dilute sulfuric acid, whereas the silver salt of the new complex platinum acid is insoluble in dilute sulfuric acid.

5. The acid is trivalent, having two strongly acidic and a third weakly acidic hydrogen as evidenced by a characteristic titration curve. An unusual kinetic effect occuring during titration of the third hydrogen suggests the possibility that it could be part of the sulfite ligand.

Turning back, now, to the said "white precipitate", and in view of the Patent Office requirement promulgated since the filing of the said earlier applications for disclosure of all known pertinent prior art, attention is invited to "The Chemistry of the Co-ordination Compounds", edited by John C. Bailar Jr., ACS Monograph, Reinhold Publishing Co., 1956, p. 57-58, where a compound of composition $Na_6Pt(SO_3)$ is disclosed (with no reference to any utility), but as having to be prepared by the complicated process of making the appropriate isomer of a platinum ammine chloride, Pt $(NH_3)_2 Cl_2$, and then converting it to $Na_6Pt(SO_3)_4$. This further points up the highly novel and greatly simplified high-yield technique of the present invention, starting with chloroplatinic acid and preparing the sodium platinum sulfite complex "white precipitate" (for which the present invention has found and taught important utility in the development of the novel complex platinum acid of the invention), substantially quantitatively.

From this novel complex platinum acid, a new colloidal sol may be prepared by decomposing the acid by heating it to dryness in air (oxidizing) and holding the temperature at about 135° C for about an hour, producing a black, glassy material which, when dispersed in water, yields a novel colloidal platinum-containing sol having an average finely divided platinum particle size of from about 15-25 Angstroms, with substantially all the platinum particles consistently lying within this range. Some platinum metal and sulfuric acid may be present and may be respectively removed by filtering (and re-cycling use of the metallic platinum) and by treating with hydroxide resin such as DOWEX 2 or the like. A jet black colloidal sol with these fine size particles is thus obtained.

From this novel product, a host of vastly improved catalytic surfaces have been obtained.

As a first example, the sol has been deposited or adsorbed on a carbon black substrate (such as electrically conductive Norit A) to form a catalytic electrode structure.

Catalytic structures have also been prepared without the step of converting the complex platinum sulfite acid to the sol. Specifically, the acid was adsorbed on the carbon substrate, decomposed with air, and reduced with hydrogen. During such reduction, it was observed that $H_2S$ evolved, indicating the retention of sulfide materials; but $H_2$ reduction at 400° C was found to remove substantially all sulfides. Again, particles in the 20-Angstrom range were produced.

A still additional example is concerned with deposition or adhering to a refractory non-conductive substrate of alumina. Sufficient complex platinum sulfite acid to contain 200 milligrams of platinum was applied to 50 cc. of insulative eta-alumina pellets, about ⅛ inch by ⅛ inch. The mixture was dried at 200° C and, to effect decomposition and adsorption, was held at 600° C in air for about 15 minutes. This resulted in a very uniform distribution of fine platinum particles (approximately 20 Angstroms) throughout the alumina surface structure, but not within the same. This was reduced by $H_2$ at 500° C for about half an hour, providing a significantly improved oxidation catalyst having the following properties, considerably improved from Houdry Platinum-on-Alumina Catalyst Series A, Grade 200 SR, a typical present-day commercial product, under exactly comparable conditions:

| Ignition Temperature For | Invention | Houdry |
| --- | --- | --- |
| 1. Methane | 335° C | 445° C |
| 2. Ethanol | 85° C | 125° C |
| 3. Hexane | 145° C | 185° C |

Another example, again bearing upon this oxidation catalyst application, involves the same preparation as in the immediately previous example, but with two and a half times the amount of particulated platinum (i.e. 500 milligrams). The following results were obtained:

| Ignition Temperature For | Invention |
| --- | --- |
| 1. Methane | 340° C |
| 2. Ethanol | 30° C (room temperature) |

-continued

| Ignition Temperature For | Invention |
|---|---|
| 3. Hexane | 130° C |

Still another example, identical to the previous one, but with 2 grams of platinum adhered to the 50 cc alumina, was found to produce the following results:

| Ignition Temperature For | Invention |
|---|---|
| 1. Methane | 250° C |
| 2. Ethanol | 30° C (room temperature) |
| 3. Hexane | 90° C |

Still another example, 200 milligrams of the preformed sol was adsorbed on alumina, and reduced with $H_2$ and found to produce the following results:

| Ignition Temperature For | Invention |
|---|---|
| 1. Methane | 310° C |
| 2. Ethanol | 45° C |
| 3. Hexane | 110° C |

For the usage of the last four examples, a range of platinum of from about 0.01% to 5% may be most useful, depending upon the economics and application.

As still a further example, the deposition or adsorption described in the last four examples, above, may also be effected on other refractory oxides in similar fashion, including silica and zirconia.

Lastly, other refractories, such as zeolites, calcium phosphate and barium sulfate, may be similarly coated by the processes of the last four examples.

While the novel complex platinum compounds, acid and/or sol may be prepared by the preferred method previously described, it has been found that the acid may also be prepared from hydroxyplatinic acid ($H_2Pt(OH)_6$) by dissolving the same cold in about 6% aqueous $H_2SO_3$, and evaporating to boil off excess $SO_2$. This appears to yield the complex platinum sulfite acid material, also (identified by its characteristic titration curve). While this process involves a lower pH, it should be noted that chloride is excluded by the starting material.

The above-described methods for the preparation of several platinum compounds of unexpected utility as sources of superior catalysts for fuel cells, oxidation catalysts, etc. have proven quite satisfactory; specifically, for producing (I) the water-insoluble salt characterized to have the composition of $Na_6Pt(SO_3)_4$: (II) the complex sulfite-platnium compound, soluble in water, and having an empirical formula and composition represented substantially by $H_3Pt(SO_3)_2OH$; and (III) the colloidal dispersion or sol of a platinum compound of unknown composition, but formed by the oxidative, thermal decomposition of (II).

Subsequent work has revealed new, unexpected and simplified means and steps of preparing not only superior forms of fuel cell catalysts but also superior supported catalysts for other catalytic usage; and it is to these techniques and structures that the present application is directed.

The basis for all of the syntheses of supported platinum catalysts is the formation of a platinum colloid capable of being deposited or adsorbed on a substrate. This deposition can be carried out, as before described, by means of a stable platinum colloid which is subsequently contacted with finely divided carbon or a refractory substrate without restriction as to the timing of such contact; or, as hereinafter described, the deposition can be carried out by means of a metastable, and thus transient, platinum-containing colloid sol which is preferbly generated in the presence of such carbon substrate or appropriate refractory substrate, thereby causing the colloidal particles to be formed and deposited on the substrate in a single step; or, as also hereinafter described, the deposition can be carried out by means of preforming such a transient colloidal platinum-containing sol and then contacting the same with the substrate promptly, (that is, within the short period of time prior to colloid particle growth which results eventually in the destruction of the colloid sol and precipitation of a platinum compound). In this sense, the term "transient colloidal platinum-containing sol", as used in the specification and the appended claims, refers to sols having a useful life from as short as less than a minute up to hours, but no more than a day or so, at room temperature, as against stable colloids which can be stored for weeks or months before use. If a transient colloid sol is used prior to contacting it with a substrate, the timing and temperature of such contacting is readily determined by trial and error.

We will now describe in detail one especially advantageous technique which involves, typically, the step of oxidizing the sulfite ligand of the preferred complex platinum compounds (I) and (II) to sulfate, in aqueous solution, by means of a non-complexing oxidant, it being understood that other platinum complexes containing ligands capable of being oxidized to substantially non-complexing products are also suitable, as later discussed.

An illustration of the synthesis of a carbon-supported platinum fuel cell catalyst or a platinum-on-refractory substrate catalyst is the observation of the oxidizing reaction of the complex platinum sulfite acid (II) with hydrogen peroxide ($H_2O_2$). When $H_2O_2$ is added to a dilute solution of the complex acid (II), the sulfite present in the sulfite-platinum complex, is oxidized to sulfate. The solutions's color slowly changes from a faint yellow to orange. Following the appearance of the orange color, a faint Tyndale effect is noted. With time, this becomes more pronounced; the solution becomes cloudy, and finally, precipitation occurs. While the material precipitated is of unknown exact composition, it is believed to be a hydrated oxide of platinum since it is soluble in base much as is hydrated platinum hydroxide or platinic acid, $H_2Pt(OH)_6$. In any case, treatment of the complex platinum sulfite acid (II) with $H_2O_2$ yields a meta-stable and thus transient colloid of a platinum compound. The sequence of reactions described above are hastened with heat, and proceed more slowly with increasing acidity, as from the addition of sulfuric acid.

Whereas in one of the earlier-described methods of forming supported catalysts a stable platinum colloidal sol is first formed and then applied to the substrate, if the reaction immediately above is performed in the presence of an appropriate substrate, or if the transient colloid is first formed and then rapidly deposited on a substrate, as explained and illustrated below, the substrate particles act both as nuclei and as a support for the colloidal particles of the platinum compound, as they are, or have first been formed, and they are deposited uniformly on the surface of the substrate rather than coalescing to yield a low surface area precipitate.

Suprisingly, it has now been found that the deposition of the transient colloid platinum particles on the surface of, for example, refractory substrates having specific surface areas in excess of substantially of the order of 10 m$^2$/gram, yields improved catalysts, even compared with the catalysts of the afore-mentioned earlier-described methods utilizing a stable colloid; and that both the stable and transient colloids yield considerably improved and thus useful catalysts on substrate carriers having surface areas lower than 5 m$^2$/gram and even as low as 0.1 m$^2$/gram.

In general, it is known that, for a given platinum catalyst loading and a given method of deposition, substrates of different specific surface areas yield catalysts which often perform differently in that, all other things being equal, platinum on a high surface substrate results usually in better catalytic performance than platinum on a low surface area substrate. Here, a high specific surface area is commonly of the order of 220m$^2$/g, and a low surface area of the order of 10m$^2$/g. Average platinum particle sizes in the range of the order of substantially 15–25 A have been obtained, on all such substrates in accordance with the earlier methods of this invention, with surprisingly good results with a specific substrate surface area less than substantially 20m$^2$/g.

It is also generally known that substrate carriers having even lower specific surface areas, in the range of 0.1m$^2$/g to less than 5m$^2$/g, though often potentially valuable due to their chemical and physical stability, definitely yield much inferior catalysts for most catalytic uses (again for a given platinum deposition chemistry).

Suprisingly, it has now been found that the transient colloid, as described above, yields not only an improved platinum catalyst on substrates with specific surface areas ranging from substantially 10m$^2$/g to above 200m$^2$/g, with the average platinum particles size now at the lower end of the said range and below, but that good catalysts can be produced on substrate carriers with much lower specific surface areas, (as low as 0.1 to 1.7m$^2$/g), where the average platinum particles size then being at the upper end of said range and above; the latter catalysts outperform platinum catalyst made, for example, by the known and commonly used technique of impregnating substrates (with surfaces areas in the 10m$^2$/gram to 220$^2$/gram range) with chloroplatinic acid solutions (followed by drying, calcining and reduction), all with the same platinum loadings. In all cases, however, in accordance with the present invention, the said platinum particles size range represents an order of magnitude though actual values may lie above or below the numerical figures.

It has also been found that the same reaction leading to a transient colloid occurs if the complex sodium platinum sulfite precipitate (I) is acidulated by dissolving in dilute sulfuric acid, and is then oxidized by treatment with H$_2$O$_2$; or if CPA is reacted with NaHSO$_3$, to yield a sulfite-platinum complex, and then oxidizingly treated with H$_2$O$_2$. The latter colloid, however, is not preferred as it is not chloride-free.

Several specific examples of the use of the generic reactions described above are given below. Basically, however, they all depend upon the oxidation of the sulfite or the like ligand present in a platinum-sulfite or like complex, with H$_2$O$_2$ being the preferred oxidant, although other non-complexing oxidants, such as persulfuric acid and the like have been used. The term "non-complexing oxidant", as used in this specification and in appended claims, means an oxidant which does not introduce groups capable of forming strong complexing ligands with platinum.

In summary, while any high surface area carbon is suitable, the carbon black, Vulcan XC-72 (Cabot Corp.), has been found to yield an excellent catalyst; but the fact that this carbon is used in some of the examples to be cited does not imply that other carbons cannot be used. Nor, since the carbon is merely a support onto which to deposit the colloidal particles of platinum as they are formed, should it be thought that carbon is the only support which the deposit can be made. Other materials such as Al$_2$O$_3$, BaSO$_4$, SiO$_2$, etc. can be used as supports for a high surface area platinum uniformly distributed throughout the substrate surface as previously described, but are, of course, useful for other catalytic usage rather than for fuel cells, electrodes and the like, because of the substrate's high electrical resistance. We shall now proceed to two series of further examples. As pointed out above, the carbon substrate of the first series (examples 1–9) can be replaced by the same amount of finely divided refractory substrate such as Al$_2$O$_3$, BaSO$_4$, SiO$_2$ etc., thereby yielding, upon reduction either by thermal decomposition and disproportionation or by a reducing agent such as hydrogen instead of an electrocatalyst, catalysts having platinum metal particles uniformly distributed throughout the surface of the substrate suitable for the afore-mentioned non-electrochemical reaction such as oxidations and the like. It is understood that such catalysts made by the hydrolysis technique of Examples 8 and 9, infra, are not as efficaceous as those made from the preferred platinum sulfite complex, presumably because of the difficulty of controlling the hydrolysis conditions. The second series (Examples 10–17) illustrates specifically the outstanding performance of the platinum catalysts produced by the preferred transient colloid technique on several substrates of widely varying specific surface areas.

EXAMPLE 1

To a liter of water, sufficient of complex platinum sulfite acid (II) is added to give a platinum concentration of 2.5 g/l. To this solution is added 22.5 grams of Vulcan XC-72. The solution has an initial pH of about 1.8 which is unaltered by the addition of carbon. The solution is stirred vigorously, so as to keep the carbon well dispersed. Add 50 ml of 30% H$_2$O$_2$, while continuing the vigorous stirring. Maintain the stirring for about 1 hour. The pH will drop slowly, indicating that hydrogen ions are being generated. Next, heat the solution to boiling, while maintaining the stirring. Filter the carbon, wash it well with water, and dry the carbon in an oven set to 100°–150° C. This air-dried material is now ready for use without further treatment. Platinum uptake is about 98% with the remainder being discharged to the filtrate. The resulting carbon, containing 9.9 – 9.8% platinum shows platinum crystallites of 5–20 Angstroms in diameter by electron microscopy. Fuel cell performance was measured using Teflon bonded anodes and cathodes having platinum loadings of 0.25mg/cm$^2$ of electrode area. Performance with H$_2$ and air, at 190° C in a phosphoric acid fuel cell, was measured and found to give 200 Amperes per square foot (ASF) at 0.670–0.680 V. The resistance loss was about 0.02 volts at this current density, so the IR-free performance was about 0.700 Volts at 200 ASF.

EXAMPLE 2

The reaction was conducted as in Example 1, but rather than heating the solution after 1 hour, stirring was continued for 24 hours at ambient temperature. Platinum uptake was 97–98%, and physical and electrochemical properties substantially identical to the produce described in Example 1 were obtained.

EXAMPLE 3

The reaction of the complex platinum sulfite acid (II) with $H_2O_2$ was conducted much as in Example 1, except the pH of the solution was adjusted to 3 with NaOH, prior to the addition of $H_2O_2$. After the 1 hour reaction period, the pH was again brought to 3 with NaOH, and the solution boiled. The carbon was filtered, washed, and dried, as previously described. Platinum uptake was substantially quantitative, and the physical and electrochemical properties of the product substantially identical to those described in Examples 1 and 2.

EXAMPLE 4

In 100 ml of $H_2O$, sufficient of the complex sodium platinum sulfite salt (I) was dissolved to yield a platinum concentration of 25g/l. The salt was put in solution by the addition of sufficient $H_2SO_4$ to drop the pH to 2. This solution was diluted with $H_2O$ to volume of 1 liter, and reacted as described in Example 3. Platinum uptake was quantitive and the physical and electrochemical properties of the product substantially identical to those already described in the previous examples.

Before proceeding further, it may be useful to hypothesize upon the mechanism of the reactions taking place in Examples 1–4; though the invention is not dependent upon the accuracy of such hypothesis, it being sufficient to describe the steps that do indeed work and produce the results of the invention.

It is believed, however, that when $H_2O_2$ is added to either the sodium platinum sulfite complex (I) or the like, dissolved in dilute $H_2SO_4$, or to a solution of the platinum acid (II), the sulfite or like ligand is destroyed. Since it is the complexing power of sulfite which is the stabilizing force in maintaining an ionic platinum species, its oxidation to sulfate destroys this stabilizing force. Sulfate is, at best, a feeble complexing agent for platinum, whether it is $Pt^{II}$ or $Pt^{IV}$. With the removal of the sulfite, there does not exist a favorable environment for maintaining a soluble species of platinum, and the platinum species just formed upon the destruction of the stabilizing sulfite must slowly hydrolyze and in the process has a transient existence as extremely small colloidal particles. It is these particles which are deposited on the substrate yielding the active catalytic structure. It is believed that the reactions of Examples 1–3 can be adequately described as being substantially:

(1) and (2) $H_3Pt(SO_3)_2OH + 3H_2O_2 \rightarrow 2H_2SO_4 + PtO_2 + 3H_2O$ (3) $Na_2HPt(SO_3)_2OH + 3H_2O_2 \rightarrow Na_2SO_4 + PtO_2 + 3H_2O + H_2SO_4$ Example 4 is somewhat different, in that the starting material is different. However, it would appear that when the complex salt of composition $Na_6Pt(SO_3)_4$ is dissolved in $H_2SO_4$, the complex acid of composition $H_3Pt(SO_3)_2OH$ is formed, since there is a vigorous evolution of $SO_2$, and when the $SO_2$ is evolved, the characteristic titration curve of $H_3Pt(SO_3)_2OH$ is observed. Hence, the reaction of Example 4 is apparently similar to that of Example 3.

In Example 5 presented below, however, CPA is reacted with $NaHSO_3$ to yield a complex believed to be the complex acid of composition $H_3Pt(SO_3)_2OH$, and HCl and NaCl are formed. One possible reaction is substantially as follows:

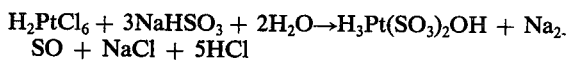
$H_2PtCl_6 + 3NaHSO_3 + 2H_2O \rightarrow H_3Pt(SO_3)_2OH + Na_2SO + NaCl + 5HCl$ However, when this mixture is treated with $H_2O_2$, the presence of chloride, along with the high acidity, leads to the formation in part, of $H_2PtCl_6$, rather than the desired colloidal species. To minimize this effect, the platinum concentration must be kept low (in order to keep the chloride concentration low) and the pH closely controlled. As aforementioned, the presence of chloride is detrimental to the formation of the supported platinum catalysts of this invention.

EXAMPLE 5

Dissolve 1 gram of CPA (0.4 gm Pt) in 100 ml water. Add 2 grams of $NaHSO_3$ and heat until the solution turns colorless. Dilute to 1 liter with water and adjust the pH to 5 with NaOH. Add 3.6 grams of Vulcan XC-72, and while stirring add 50 ml of 30% $H_2O_2$. Continue to stir and as the pH changes, add NaOH to maintain the pH between 4 and 5. When the pH has stabilized, heat the solution to boil, and filter and wash the carbon. Platinum pickup is variable, but in general is about 90%. Increasing the platinum concentration decreases the percentage of platinum deposited upon the carbon since the conversion of $H_2PtCl_6$ is favored. The catalyst formed in this way, has been found to be substantially identical in performance to that made in Examples 1 ∝ 4, but, when a refractory substrate is substituted in this example for the Vulcan XC-72 carbon, the resulting catalyst is inferior to the platinum catalysts on the same refractory made in accordance with the other examples given herein.

As compared with the earlier described methods of said prior applications, also embodied herein, the additional methods, supra, avoid the conversion of the compound having the composition of $Na_6Pt(SO_3)_4$ and $H_3Pt(SO_3)_2OH$, respectively, to the stable colloidal sol material. This latter colloid, in turn, must then be applied to carbon, or a substrate, filtered, dried, and reduced in $H_2$ in accordance with the earlier methods. As described in Example 4, for instance, the compound of composition $Na_6Pt(SO_3)_4$ is dissolved in acid, reacted with $H_2O_2$ in the presence of carbon, the product filtered, washed and dried and with no $H_2$ reduction necessary, since the sintering temperature required to prepare the electrodes is ample to decompose the adsorbed species to the catalytically-active platinum particles.

EXAMPLE 6

5 g of the precipitate having the composition corresponding to $Na_6Pt(SO_3)_4$ is suspended in about 100cc of water and reacted with a large excess of the ammonium form of Dowex 50 (a sulfonated copolymer of styrene and divinylbenzene) cation exchange resin in bead form until the precipitate is dissolved. The pH of the resulting solution is about 4. After filtration, the solution is passed through a column of Dowex 50 in the ammonium form until all of the sodium is removed. The resulting platinum sulfite complex in solution is then oxidized with hydrogen perioxide in the presence of finely divided carbon, using the procedure of Example 1, yielding a nearly equivalent electro-catalyst.

Similar results are obtainable by first neutralizing to pH 9 a solution of the complex compound corresponding to $H_3Pt(SO_3)_2OH$ with aqueous ammonia which neutralization requires almost five moles of $NH_3$ (instead of only 3 moles in the case of neutralization by NaOH), then acidifying the solution to pH 3 with sulfuric acid, and oxidizing with $H_2O_2$ in the presence of carbon, again using the procedure of Example 1.

In both the earlier methods of the said applications and the additional methods supplementarily discussed herein, however, common over-all steps are involved of forming the complex sodium platinum sulfite precipitate from CPA, acidifying the same and developing the complex platinum sulfite acid and oxidizing such into a platinum colloidal sol, which is applied to the substrate and reduced to form the catalyst.

While the above examples relate to a complex platinum sulfite as the starting material for an appropriate platinum colloid, other platinum complexes comprising oxidizable ligands can be similarly used, as before stated, to produce suitable platinum colloids by means of a non-complexing oxidant, as illustrated in the next example.

EXAMPLE 7

Four grams of platinic acid, $H_2Pt(OH)_6$, were dissolved in 25 milliliters of 1 molar NaOH. Six grams of sodium nitrite were dissolved in this solution and then the mixture was diluted to a volume of 800 millileters.

EXAMPLE 8

Four grams of platinic acid, $H_2Pt(OH)_6$, were dissolved in 10 milliliters concentrated $HNO_3$. This solution was slowly added to 1 liter of water containing 18 grams of finely divided carbon (Vulcan XC 72) while vigorous stirring was maintained for 1 hour, and then the pH was adjusted to 3 with NaOH, while continuing stirring. The dispersion was then boiled, while stirring. This colloid was thus produced by hydrolizing a non-complex platinum salt solution at the above appropriate pH. The resulting platinized carbon was filtered, washed and dried. Fuel cell electrodes were fabricated therefrom having a platinum loading of 0.25 milligrams per square centimeter and a phosphoric acid fuel cell constructed. Performance with hydrogen and air at 190° C was 660 millivolts at 200 amperes per square foot.

EXAMPLE 9

The experiment of Example 8 was repeated except 6 molar $H_2SO_4$ was substituted for nitric acid, this time producing the colloid by hydrolyzing the non-complex platinum salt resulting from the $H_2SO_4$ reaction at the same pH of about 3. Fuel cell performance under similar conditions as in Example 8 was 667 millivolts at 200 amperes per square foot.

The platinized carbon electrodes produced with the non-complex platinum sols of Examples 8 and 9, while most useful for the purposes described, have given somewhat lower fuel cell voltages at the same current densities than electrodes made from the preferred platinum sulfite complex, before discussed, apparently because of the difficulties involved in controlling the hydrolysis conditions required for the non-complex salt processes.

The catalysts of the succeeding examples 10–17 were subjected to the following test procedure.

The catalysts were tested in a reactor of the following design. The reactor is constructed of aluminum tubing, stands 10 inches high and ⅜ inch in diameter. It is wrapped with heavily insulated electrical heating wire, but otherwise uninsulated. Heat is supplied via power from a 110V Variac. The base of the reactor is a perforated aluminum plate which supportes the catalyst bed. A thermocouple probe is situated just above the support plate, in order to monitor the input gas temperature. The top of the reactor is provided with an outlet tube to permit exhaust of the reaction products.

The input gases, air and pure methane, are fed through calibrated flowmeters. The total flow rate is 1 liter per minute, consisting of 99.5% air and 0.5% methane (except when otherwise stated). The catalyst bed, in all tests, is 3 inches deep, and has a volume of 15 $cm^3$.

The reaction products are fed through a gas chromatograph, calibrated for $N_2$, $O_2$, and $CH_4$. Hence, the degree of methane oxidation, and oxygen depletion can be monitored at any measured inlet temperature.

In order to yield more accurate comparative data than above described, methane oxidation was measured quantitively using the gas chromatograph, rather than relying upon the more qualitative light off test (which depends upon the measurement of the inlet temperature at which a sudden rapid rise of bed temperature occurs).

EXAMPLE 10

A substrate of alpha alumina ($Al_2O_3$) powder having a surface area of $10m^2$/gram was catalyzed by three different techniques. In one case, 100 grams of the $Al_2O_3$ was impregnated with sufficient chloroplatinic acid to yield a product containing 2% Pt by weight after treatment. The treatment consisted of air drying at 150° C for 2 hours, calcination in air for 3 hours at 450° C and finally, reduction in $H_2$ at 450° C for 3 hours (catalyst A-1). The product was pelletized.

In the second case, 100 grams of alpha-$Al_2O_3$ was impregnated with sufficient solution of $H_3Pt(SO_3)_2OH$ to yield a product containing 2% Pt by weight after treatment. The treatment consisted of air drying at 150° C for 2 hours, and calcination in air at 350° C for 2 hours causing thermal reduction to platinum metal particles by decomposition and disproportionation, (catalyst B-1). The product was pelletized.

In the third case, 100 grams of the alpha-$Al_2O_3$ were dispersed in 250 ml of $H_2O$. To this were added 10 ml of $H_3Pt(SO_3)_2OH$ solution containing 2 grams of Pt. While the mixture was being stirred, 10 ml of 35% $H_2O_2$ solution were added and the stirring continued for 1 hour. The slurry was then filtered and the product calcined in air for 2 hours at 350° C, again causing thermal reduction to platinum metal particles (catalyst C-1). The product was pelletized.

The three catalysts, A-1, B-1 and C-1, were compared by measuring the inlet temperature $T_{50}$, at which a 0.5% $CH_4$ – 99.5% air mixture yielded 50% $CH_4$ oxidation. The results are summarized in Table 1, with the right-hand column representing the temperature (° C) at which 50% of the methane is oxidized when fed in the mixture referred to above.

TABLE 1

| Catalyst | $T_{50}$ $CH_4$, ° C (0.5% $CH_4$) |
|---|---|
| A-1 | 435 |
| B-1 | 330 |

TABLE 1-continued

| Catalyst | $T_{50}$ $CH_4$, °C (0.5% $CH_4$) |
|---|---|
| C-1 | 270 |

Catalyst C-1 thus provided to be outstandingly superior.

EXAMPLE 11

In this example, a gamma alumina ($Al_2O_3$) powder having a very high surface area of 220m²/gram was catalyzed with chloroplatinic acid, as described in Example 10 to yield a 2% by weight platinum product (catalyst A-2) and pelletized.

A second batch of this alumina was catalyzed by adding slowly to a stirred mixture of 100 grams of gamm-$Al_2O_3$ and 100 ml of $H_2O$, 10 ml of $H_3Pt(SO_3)_2OH$ containing 200 gm/liter Pt. The slurry was filtered, dried for 2 hours at 450° C, and pelletized (catalyst B-2). The impregnation technique was not used as in Example 10, since the high surface area alumina adsorbs completly the $H_3Pt(SO_3)_2OH$ which is not the case for chloroplatinic acid, nor for the sulfite acid when using a lower surface area aluminum, e.g. the 10m²/gram material of Example 10.

A third batch of the gamma $Al_2O_3$ was catalyzed by the $H_2O_2$ technique of example 10. In this case, the $H_2O_2$ oxidation was done prior to the addition of the platinum solution to the $Al_2O_3$, since once the sulfite acid is adsorbed by the high surface area $Al_2O_3$, it will not react with $H_2O_2$.

For this catalyst, 100 grams of $Al_2O_3$ and 100 ml of $H_2O$ were mixed, and stirred vigorously. In a separate vessel, 10 ml of $H_3Pt(SO_3)_2OH$ containing 2 grams of platinum, were diluted to 30 ml with water and 10 ml of 35% $H_2O_2$ added. The solution was allowed to stand for 2 minutes, during which time the color changed from yellow to a deep red-brown. This solution was then promptly added to the stirred $Al_2O_3$ slurry, and stirring continued for 5 minutes. The slurry was filtered, calcined (to produce platinum metal particles) at 350° C for 2 hours and pelletized (catalyst C-2).

The three catalysts were compared, as in Example 2: The results are summarized in Table 2.

TABLE 2

| Catalyst | $T_{50}$ $CH_4$ °C (0.5% $CH_4$) |
|---|---|
| A-2 | 365 |
| B-2 | 285 |
| C-2 | 265 |

Clearly, Catalysts B-2 and C-2 are strikingly superior to Catalyst A-2.

EXAMPLE 12

In order to differentiate more closely, any differences between catalysts B-2 and C-2 of Example 9, the $CH_4$ content of the input gas to the reactor was dropped to 0.1%, thus minimizing the effect of heat generated from the oxidative reaction. The percent of $CH_4$ oxidation was measured at various inlet temperatures, and these data are summarized in Table 3.

TABLE 3

| | % $CH_4$ Oxidation (0.1% $CH_4$) | |
|---|---|---|
| T Inlet, °C | B-2 | C-2 |
| 25 | 0 | 0 |
| 265 | 7.5 | 16 |
| 290 | 25.0 | 53 |

TABLE 3-continued

| | % $CH_4$ Oxidation (0.1% $CH_4$) | |
|---|---|---|
| T Inlet, °C | B-2 | C-2 |
| 306 | 28.0 | 60 |
| 328 | 53.0 | 75 |

The superiority of catalyst C-2 is evident.

EXAMPLE 13

A sample of catalyst manufactured by Houdry, their Series A, Grade 200SR, (hereinafter referred to as catalyst A-3) containing 0.5% Pt on $Al_2O_3$ having a surface area of 165m²/gram was compared with a 0.5% Pt catalyst, C-3 prepared in the manner described for C-1, Example 10, employing alpha-$Al_2O_3$ with a surface area of 10m²/gram. The results are summarized in Table 4, wherein the oxidation rates of 0.5% $CH_4$ are compared.

TABLE 4

| | % $CH_4$ Oxidation (0.5% $CH_4$) | |
|---|---|---|
| T Inlet, °C | A-3 | C-3 |
| 310 | 2 | 25 |
| 330 | 7 | 50 |
| 420 | 40 | 80 |

EXAMPLE 14

Alpha-alumina having a specific surface area of 6m²/gram was prepared by heating a 100 g sample of 10m²/gram alpha-alumina to 1200° C for 2 hours. Upon cooling, this alumina was catalyzed to contain 2% Pt by weight by means of the $H_2O_2$ technique described in example 10, yielding catalyst C-4. The temperature at which 50% of the methane was oxidized was 280° C.

EXAMPLE 15

Three samples of zirconia $ZrO_2$ having a specific surface area of 1.7m²/gram were catalyzed each to contain 2% Pt by weight, utilizing the three different techniques described in Example 10 and yielding, respectively, catalyst A-5 (by CPA impregnation), catalyst B-5 (by $H_3Pt(SO_3)_2OH$ impregnation) and catalyst C-5 (by the $H_2O_2$ technique). The results for $CH_4$ oxidation are summarized in Table 5.

TABLE 5

| Catalyst | $T_{50}$ $CH_4$ °C (0.5% $CH_4$) |
|---|---|
| A-5 | 490° |
| B-5 | 290° |
| C-5 | 285° |

Thus, typical techniques of this invention produce not only catalysts (B-5 and C-5) with greatly superior performance to catalyst A-5 (made by the CPA technique) on 1.7m² zirconia, but B-5 and C-5 actually outperform catalyst A-1 and A-2 (see examples 10 and 11) made by the CPA technique on the aluminas having surface areas of 10m²/gram and 220m²/gram, respectively.

EXAMPLE 16

A sample of industrial grade silicon carbide, having a surface area of only 0.1m²/gram was catalyzed to contain 2% Pt using the technique described in Example 10 for Catalyst C-1. The results for $CH_4$ oxidation of this catalyst (C-6) are summarized in Table 6.

TABLE 6

| T Inlet, °C | % CH₄ Oxidation (0.5% CH₄) C-6 |
|---|---|
| 355 | 12 |
| 405 | 40 |
| 419 | 46 |

Note that catalyst C-6 (substrate surface area 0.1m²/gram) is better than catalyst A-1, made by the conventional chloroplatinic acid route of depositing platinum on a substrate having a surface area of 10m²/gram.

EXAMPLE 17

Three samples of finely powdered fused alumina from the Norton Company recommended by the maker for use as an abrasive, having a specific surface area of only 0.25m²/gram were catalyzed as described in example 10, yielding, respectively, catalyst A-7 (CPA technique), B-7 (H₃Pt(SO₃)₂OH technique) and C-7 (H₂O₂ technique). The results for CH₄ oxidation of catalysts A-7, B-7 and C-7 are summarized in Table 7.

TABLE 7

| Catalyst | T₅₀ CH₄ ° C(0.5%CH₄) |
|---|---|
| A-7 | 490° |
| B-7 | 340° |
| C-7 | 340° |

The superiority of catalysts B-7 and C-7 (vs. catalyst A-7) is spectacular.

A summary comparing the performance of the catalysts of the above Examples, all containing 2% Pt, is presented in Table 8.

TABLE 8

| Ex. No. | Nature of substrate | Specific surface area of substrate (m²/g) | T₅₀(0.5% CH₄) A (CPA impregnation) | T₅₀(0.5% CH₄) B (H PtSO₃OH impregnation) | T₅₀(0.5% CH₄) C (H₂O₂ technique) |
|---|---|---|---|---|---|
| 11 | gamm-Al₂O₃ | 220 | 365° C | 285° C | 265° C |
| 10 | alpha-Al₂O₃ | 10 | 435° C | 290° C | 270° C |
| 14 | alpha-Al₂O₃ | 6 |  |  | 280° C |
| 15 | zirconia (ZrO₂) | 1.7 | 490° C | 290° C | 285° C |
| 17 | fused Al₂O₃ | 0.25 | 490° C | 340° C | 340° C |
| 11 | silicon carbide | 0.1 |  |  | 420° C |

As before stated, while only illustrative catalytic uses have been described, the invention is clearly applicable to a wide variety of electrodes, oxidation, hydrogenation, de-hydrogenation, reforming, cracking, chemical reaction-aiding, contaminant burning and other uses, as well. Further modifications will also occur to those skilled in this art and all such are considered to fall within the spirit and scope of the invention as defined in the appended claims.

What is claimed is:

1. In the method of preparing a catalytic structure suitable for high temperature operation, the steps of oxidizing the ligand of an oxidizable-ligand-containing complex platinum compound by adding thereto an aqueous solution of a non-complexing oxidant to produce a colloidal platinum-containing sol; applying said sol to a substrate so that the particles of the substrate act both as nuclei and as mechanical support for the colloidal particles of the applied sol; and reducing the colloidal particles on said substrate, thereby depositing platinum metal particles uniformly throughout the surface of the substrate as a result of such nucleation.

2. The method of claim 1 wherein said colloidal sol is transient and is produced in the presence of the substrate.

3. The method of claim 1 wherein said complex platinum compound is selected from the group consisting of compounds having substantially the empirical formulas H₃Pt(SO₃)₂OH, Na₂HPt(SO₃)₂ or Na₆Pt(SO₃)₄ and mixture thereof.

4. The method of claim 1 wherein said oxidant is selected from the group consisting of hydrogen peroxide and persulfuric acid.

5. The method of claim 1 and in which the substrate comprises finely divided carbon.

6. The method of claim 1 wherein the substrate is selected from refractory substrates having a specific surface area less than substantially 20 square meters/gram.

7. A catalytic structure suitable for high-temperature operation comprising a platinum-loaded substrate prepared by the method of claim 1, and in which the average particle size of the platinum metal particles is of the order of substantially 15 to 25 Angstroms.

* * * * *